(12) United States Patent
Goforth et al.

(10) Patent No.: US 7,225,665 B2
(45) Date of Patent: Jun. 5, 2007

(54) PROCESS AND APPARATUS FOR MEASURING THE SHAPE OF AN ARTICLE

(75) Inventors: Douglas Edmon Goforth, Painted Post, NY (US); Josef Chauncey Lapp, Corning, NY (US); Michael Thomas Murtagh, Painted Post, NY (US); Brian Paul Strines, Painted Post, NY (US); Natesan Venkataraman, Painted Post, NY (US); Glen Bennett Cook, Corning, NY (US)

(73) Assignee: Corning Incorporated, Corning, NY (US)

( * ) Notice: Subject to any disclaimer, the term of this patent is extended or adjusted under 35 U.S.C. 154(b) by 142 days.

(21) Appl. No.: 11/192,381

(22) Filed: Jul. 27, 2005

(65) Prior Publication Data

US 2007/0028681 A1    Feb. 8, 2007

(51) Int. Cl.
G01B 5/28    (2006.01)
(52) U.S. Cl. ......................................... 73/105
(58) Field of Classification Search ............... 73/105
See application file for complete search history.

(56) References Cited

U.S. PATENT DOCUMENTS

| 5,319,960 | A | * | 6/1994 | Gamble et al. ............... 73/105 |
| 5,831,153 | A | * | 11/1998 | Binnig et al. ................. 73/105 |
| 2002/0139178 | A1 | | 10/2002 | Nakamura .................... 73/105 |
| 2004/0025579 | A1 | | 2/2004 | Nakamura .................... 73/105 |
| 2004/0026618 | A1 | | 2/2004 | Nakamura .................. 250/306 |

* cited by examiner

*Primary Examiner*—Hezron Williams
*Assistant Examiner*—John Fitzgerald
(74) *Attorney, Agent, or Firm*—Kevin M. Able (57) ABSTRACT

A method of measuring the shape of a glass sheet is provided. The method includes positioning the glass sheet in contact with a fluid and measuring the distance between a sensor and a surface of the glass sheet at a plurality of locations on the surface thereof. The method may further include deconvolving the shape of the glass sheet into at least one simple shape element, such as cylindrical or spherical, and may further include varying the temperature profile of an array of heaters in a glass manufacturing process based on the at least one shape element.

20 Claims, 6 Drawing Sheets

PROCESS AND APPARATUS FOR MEASURING THE SHAPE OF AN ARTICLE

BACKGROUND OF THE INVENTION

1. Field of the Invention

The present invention relates to a method for measuring the shape of an article, and more particularly a method for measuring the shape of a glass sheet.

2. Technical Background

Thin sheets of glass are finding use in an increasing array of manufactured articles, and in particular electronic articles including both desktop and laptop computers, cell phones and televisions. Television displays, especially, are undergoing a transformation from historically old cathode ray tubes (CRTs) to plasma and liquid crystal displays (LCDs). Additionally, consumer demand is pressing manufacturers of such non-CRT displays to offer increasingly larger display sizes.

The need to produce larger and larger sheets of display glass while adhering to already stringent requirements pertaining to such parameters as surface quality are pushing the limits of existing methods of manufacturing glass sheet. It is known, for example, that residual stress which may exist within a large glass sheet will cause a smaller sheet which may be cut from the larger sheet to assume a shape different than the parent glass as those pre-existing stresses are relieved and/or redistributed.

Glass sheet may be formed by a variety of methods, including the well-known float process, wherein a glass melt is floated on a bath of liquid metal, typically tin. Another popular method of manufacturing glass sheets is known as the fusion draw method (FDM), wherein a molten glass is fed into a trough. The molten glass overflows both sides of the trough in a controlled manner, and the separate glass flows are re-united at the apex of the trough. Accordingly, the exposed surface of the glass sheet is pristine and the glass sheet may be drawn from the apparatus in a ribbon. A fusion process for forming glass sheet is explained more fully in U.S. Pat. Nos. 3,338,696 and 3,682,609 (Dockerty), the contents of which are incorporated herein in their entirety by reference.

When forming thin glass sheet by a continuous ribbon forming method such as the overflow downdraw, or fusion process, shape can be imparted on the sheet product. Sheet shape can manifest itself in many forms, including bow, sag, "s-warp", etc. Ultimately, the sheet shape can become a problem for downstream customers for several reasons: edges of the glass that are not in a plane can become a source of breakage due to impact; severely shaped glass may not vacuum chuck down in the various tools used to manufacture LCDs thereby leading to throughput slowdown or may generate high stress levels in the glass substrate leading to breakage. Even moderately shaped glass may not lay down on various chucking devices, thus leading to non-uniformities in the deposited thin films which make up the electronic portions of the display. In order to make a low stress and/or low warp product it is required that sheet shape be fundamentally understood and reduced to minimal levels.

A non-planar sheet shape can be caused by a number of processing factors, including bending and vibration of the drawn glass ribbon within the elastic temperature range which is transmitted upward into the visco-elastic region, and "frozen-in" thermal stress effects. Such movement may result from cutting of the ribbon into a separate pane or sheet. Shape may also result from frozen-in stresses, such as can occur when a non-flat, across-the-draw temperature gradient occurs in the sheet as it passes through the visco-elastic temperature range. Because in many cases the drawn glass ribbon is exceptionally thin (such as glass used in display devices) much of the frozen-in stress may be compensated for by shape formation. That is, the ribbon deforms to relieve the stress. This form of shape is transient in nature, and may be substantially relieved or redistributed upon cutting of the ribbon into individual sheets, or later re-cutting of the sheet into still smaller portions.

While sheet shape has been examined to some extent, precise sheet shape measurement methods are required to better analyze the contour of the sheets, in order to best control the formation of shape. In addition, while current mechanical feeler gauge methods can analyze sheet shape to some degree, it is difficult to eliminate gravity-based sag effects from the measurement.

SUMMARY

Embodiments of the present invention provide a method for measuring a glass article, and in particular a glass sheet, to determine a shape of the glass sheet. The inventive method may further comprise using the determined shape of the glass sheet in a glass manufacturing process.

In accordance with an embodiment of the present invention, a glass sheet is measured by positioning the glass sheet in contact with a fluid having a pre-determined average density and a pre-determined average refractive index, the glass sheet also having a pre-determined average density and a pre-determined average refractive index. The distance from a sensor to a plurality of points on a surface of the glass sheet are measured to obtain a spatial distribution of distance. Once a spatial distribution of distance has been determined, a shape of the glass sheet may be calculated using the spatial distribution of distance measurements. Preferably, the average density of the fluid is at least about 85% of the average density of the glass sheet; more preferably at least about 95%; most preferably the average density of the fluid is substantially equal to the average density of the glass sheet.

In another broad aspect of the invention, an apparatus for measuring the shape of a glass sheet is disclosed, the apparatus comprising a fluid, a container for holding the fluid, at least one sensor for measuring a distance between the at least one sensor to a plurality of points on a surface of the glass sheet to obtain a spatial distribution of distance, a computing device in communication with the sensor for calculating a shape of the glass sheet and wherein the average density of the fluid is at least about 85% of the average density of the glass sheet. Preferably, the average density of the fluid is substantially equal to the average density of the glass sheet The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

The present invention is directed at, in part, understanding the essentially gravity-free shape of a pane of glass cut from the ribbon, e.g. measuring the shape of the pane. The invention may further include reducing the levels of undesirable distortion exhibited when panes or substrates are flattened by de-convolving the elemental shape elements which comprise the overall shape of the glass sheet, or pane, cut from the ribbon, and using the information thus obtained to modify the thermal history of the ribbon and minimize or eliminate undesirable distortion.

Figure 1:
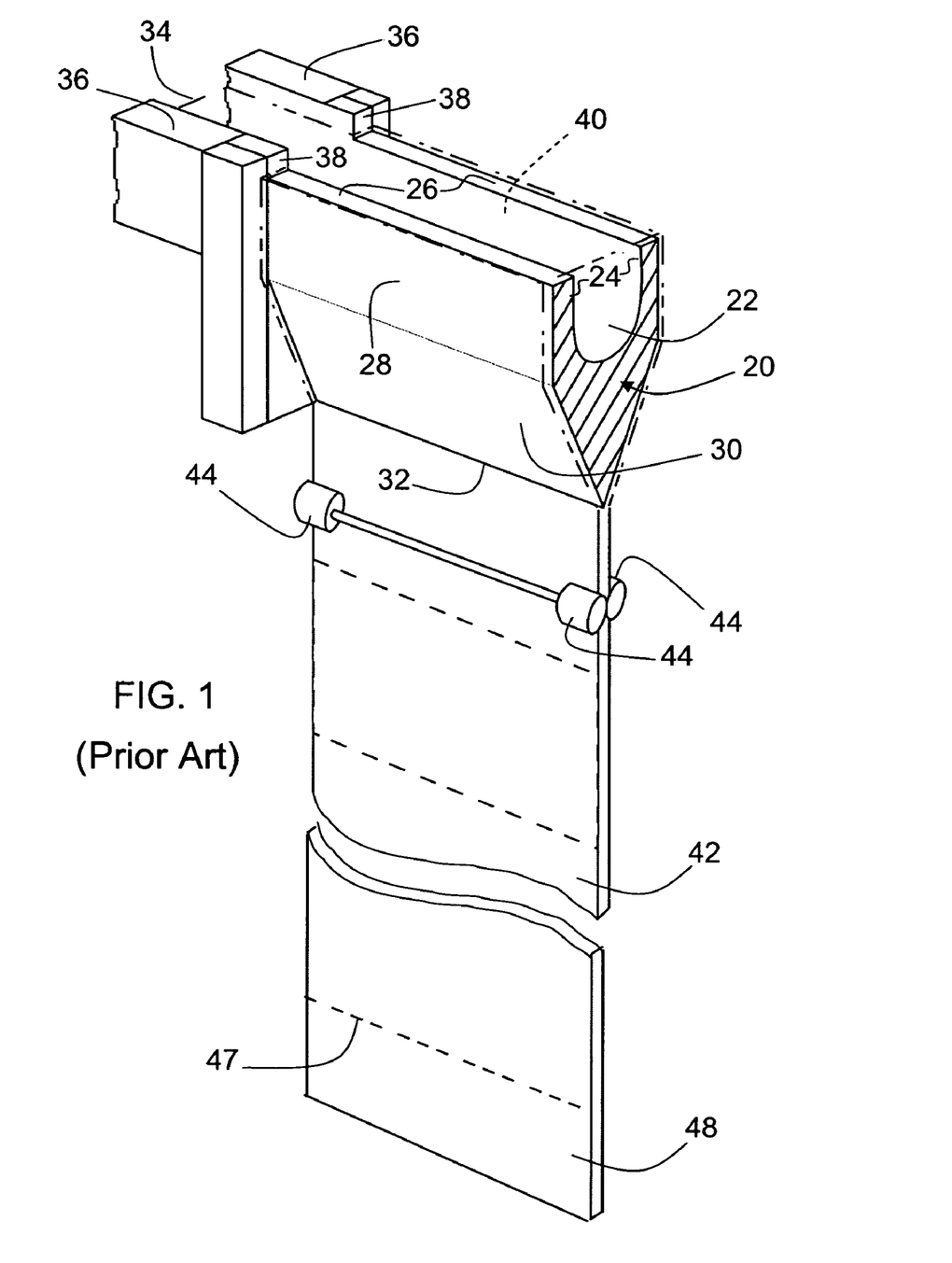
FIG. 1 is a partial cutaway perspective view of a typical fusion process for manufacturing glass sheet.

In an overflow downdraw process for forming glass ribbon, such as that illustrated in FIG. 1, an overflow trough member of forming wedge 20 includes an upwardly open channel 22 bounded on its longitudinal sides by wall portions 24, which terminate at their upper extent in opposed longitudinally-extending overflow lips or weirs 26. The weirs 26 communicate with opposed outer ribbon forming surfaces of wedge member 20. As shown, wedge member 20 is provided with a pair of substantially vertical forming surface portions 28 which communicate with weirs 26, and a pair of downwardly inclined converging surface portions 30 which terminate at a substantially horizontal lower apex or root 32 forming a straight glass draw line. It will be understood that surface portions 28, 30 are provided on each longitudinal side of the wedge 20.

Molten glass 34 is fed into channel 22 by means of delivery passage 36 communicating with channel 22. The feed into channel 22 may be single ended or, if desired, double ended. A pair of restricting dams 38 are provided above overflow weirs 26 adjacent each end of channel 22 to direct the overflow of the free surface 40 of molten glass 34 over overflow weirs 26 as separate streams, and down opposed forming surface portions 28, 30 to root 32 where the separate streams, shown in chain lines, converge to form a ribbon of virgin-surfaced glass 42. Pulling rolls 44 are placed downstream of the root 32 of wedge member 20 and are used to adjust the rate at which the formed ribbon of glass leaves the converging forming surfaces and thus determine the nominal thickness of the ribbon.

The pulling rolls are preferably designed to contact the glass ribbon at its outer edges, specifically, in regions just inboard of the thickened beads which exist at the very edges of the ribbon. The glass edge portions which are contacted by the pulling rolls are later discarded from the sheet. A pair of opposed, counter-rotating pulling rolls are provided at each edge of the ribbon.

As glass ribbon 42 travels down the drawing portion of the apparatus, the ribbon experiences intricate structural changes, not only in physical dimensions but also on a molecular level. The change from a thick liquid form at, for example, the root of the forming wedge, to a stiff ribbon of approximately one half millimeter of thickness is achieved by a carefully chosen temperature field or profile that delicately balances the mechanical and chemical requirements to complete the transformation from a liquid, or viscous state to a solid, or elastic state. At a point within the elastic temperature region, the ribbon is cut at cut line 47 to form a glass sheet or pane.

In spite of the care taken to apply a given temperature profile during the transition through the visco-elastic region of the glass, the thermal profile to which the glass ribbon is exposed may nevertheless result in stresses which may then deform the glass sheet as residual stresses redistribute or relieve themselves. That is, the shape of a sheet of glass derived from the ribbon is dependent upon the thermal history of the ribbon during the transition of the ribbon through the visco-elastic region, and that thermal history may vary. Such changes in stress and/or shape may be detrimental to processes which rely on dimensional stability, such as the deposition of circuitry onto a substrate, such as is found in the manufacture of liquid crystal displays. For example, in the manufacture of liquid crystal displays, large glass sheets cut from the drawn ribbon may themselves be cut into a plurality of smaller sections. Each division may therefore result in a relief or redistribution of stress, and a subsequent shape change. It is desirable therefore that a method be devised wherein the shape of a glass sheet cut from the ribbon may be accurately determined. The information thus obtained may used to modify the thermal history of the glass ribbon being drawn.

Figure 2:
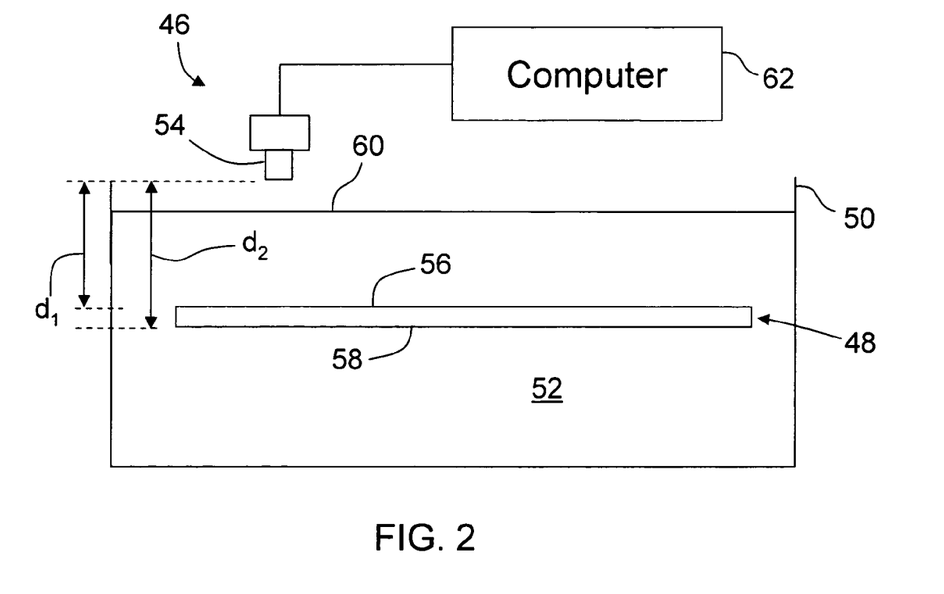
FIG. 2 is a side cross sectional view of a glass sheet measurement apparatus according to an embodiment of the present invention

FIG. 2 illustrates an embodiment of a method of determining the shape of a glass article, such as a glass sheet, according to the present invention. It should be understood that the methods disclosed herein may be used to measure other articles. However, the present description will be made in terms of glass sheet for illustrative purposes, and should not be considered limiting in this regard.

In accordance with the embodiment of FIG. 2, generally designated by reference numeral 46, glass sheet 48 is positioned in container 50 containing fluid 52. Glass sheet 48 may be positioned on the surface of the fluid, or submerged within the fluid, as described in more detail hereinbelow. The glass sheet has a pre-determined average density and a pre-determined average refractive index. The fluid also has a pre-determined average density and a pre-determined average refractive index. Preferably, the average density of the fluid is at least about 85% of the average density of the glass sheet; more preferably at least about 90%; still more preferably at least about 95%. Fluid 52 is said to be of neutral density relative to glass sheet 48 when the average density of the fluid is at least about 85% of the average density of the glass sheet, and the glass sheet is said to be neutrally buoyant, in that the glass sheet should remain in a given position within fluid 52 without mechanical support for a time sufficient to complete a given measurement. Suitable fluids, for example, are available from Cargille Inc., which manufactures refractive index matching liquids, immersion liquids, optical coupling liquids, refractometer liquids and other specialty liquids. Such liquids are advantageous in that they are typically non-toxic and the density of the fluid is easily tuned, such as by increasing or decreasing the concentration by evaporation, for example. Tuning of the fluid density may also be accomplished by mixing two or more fluids having different densities such that a desired pre-determined average density of the mixture is achieved. For example, Eagle 2000™ glass manufactured by Corning Incorporated has an average density of about 2.37 g/cc. Several fluids, such as a first fluid having an average density of 2.35 g/cc and a second fluid having an average density of 2.45 g/cc, may be mixed in amounts effective to obtain a third fluid having an average density substantially equal to 2.37 g/cc. One skilled in the art will realize that any fluid or fluids having the requisite properties of density may be used.

Continuing with FIG. 2, sensor 54 is used to measure a distance from the sensor to a surface of the glass sheet. Glass sheet 48 comprises a first side 56 facing sensor 54 (the sensor side), and a second, non-sensor-facing side 58. In the present embodiment, sensor side 56 may be referred to as top side 56 and non-sensor side 58 may be referred to as bottom side 58. To ensure that a surface of the glass may be detected by sensor 54, it is desirable that the average refractive index of fluid 52 be detectably different than the average refractive index of glass sheet 48. The allowable difference between the average refractive index of the fluid and the average refractive index of the glass is determined by such factors as the sensitivity of sensor 54. Alternatively, in the case where a given sensor is not able to distinguish between the difference between the average refractive index of the glass sheet and the average refractive index of the fluid, a thin film or coating (not shown) may be applied to a surface of glass sheet 48, preferably applied to bottom side 58 of the sheet, so that measurements of the distance between the sensor and the glass-coating interface may be obtained. Measurement of the coating itself, such as if the coating was adhered to top side 56 (sensor-side), may induce erroneous measurements, as one then measures the surface of the film rather than the surface of the glass. The coating is preferably, though not necessarily, opaque, and may comprise, for example, a paint, ink or dye. A white, opaque coating has been found to achieve superior results. However, any coating that has a refractive index detectably different than the refractive index of the fluid may be acceptable. For example, the coating may comprise a polymer film wherein the polymer has an average refractive index detectably different from the average refractive index of the fluid. It is desirable that any stress applied by the coating to glass sheet 48 be insufficient to cause additional deformation of the glass sheet. For this reason, the coating may be applied to the glass sheet in a discontinuous fashion, such in a series of dots, lines or other shapes. Optionally, a thickness of the glass sheet may also be measured as a function of location on the glass sheet, and combined with the film-glass interface distance data to produce a surface contour map for the sensor side of the glass sheet.

In accordance with the embodiment, once glass sheet 48 has been positioned in fluid 52, sensor 54 may be used to measure a distance from the sensor to a surface of the glass sheet. Sensor 54 may be used to measure the distance $d_1$ between the sensor and top surface 56 of the glass sheet, or sensor 54 may be used to measure the distance $d_2$ between the sensor and bottom surface 58 of the glass sheet. Sensor 54 may be used to measure both $d_1$ and $d_2$, from which a thickness t of the glass sheet at any particular point may be determined as $t=d_2-d_1$. Sensor 54 may comprise, for example, a laser displacement sensor. However, sensor 54 may comprise other devices as are known in the art for measuring distances, such as an acoustic sensor. Laser devices may include simple laser ranging devices, or more elaborate devices, such as, for example, a Michelson interferometer. The sensor may be time-based wherein a sensed energy, such acoustic, having a known velocity in the fluid, is timed. A suitable sensor, for example, is the LT8110 confocal laser displacement sensor manufactured by Keyence Corporation of America. Although sensor 54 may be positioned above the surface of the fluid, the sensor is preferably in contact with the fluid, therefore advantageously eliminating the air-fluid interface at fluid surface 60. Sensor 54 may be completely immersed in the fluid.

As described above, one need not directly measure top surface 56 of glass sheet 48 to obtain a contour map of the top surface. For example, in the case where a coating has been applied to bottom surface 58, measurements of the distance from the sensor to the glass-coating interface at bottom surface 58 may be obtained to determine a surface contour map of the bottom surface, which may then be combined with known thickness data for the glass sheet to obtain a contour map for top surface 56. Typically, for sheets of glass used in the manufacture of displays, top and bottom sides are substantially parallel and the sheet has a uniform thickness, generally on the order of less than a millimeter. Thus, measurement of only a single surface may suffice to determine the sheet shape.

Relative movement between sensor 54 and glass sheet 48 allows a distance from the sensor to the glass sheet to be measured at a plurality of locations. Generally, the greater the number of measurement locations, the greater the accuracy with which the distance to the glass as a function of location, or surface contour, of the sheet can be determined. Sensor 54 is preferably moved relative to the measured surface of glass sheet 48 in a plane parallel with the general plane of the sheet. Preferably, measurements are taken at discrete points on the surface of the glass. Movement of the sensor relative to the glass sheet is particularly desirable when the glass sheet becomes very large, e.g. in excess of 1 $m^2$. Measurements may be taken at discrete points along parallel lines across the glass surface, or measurements may be made at pre-determined locations in a non-linear fashion. The measurement distances and locations may then be plotted by computing device 62 to form the desired contour map of the surface, indicative of the shape of the glass sheet. Optionally, a mathematical model of the surface contour may be developed using conventional modeling methods.

Figure 3:
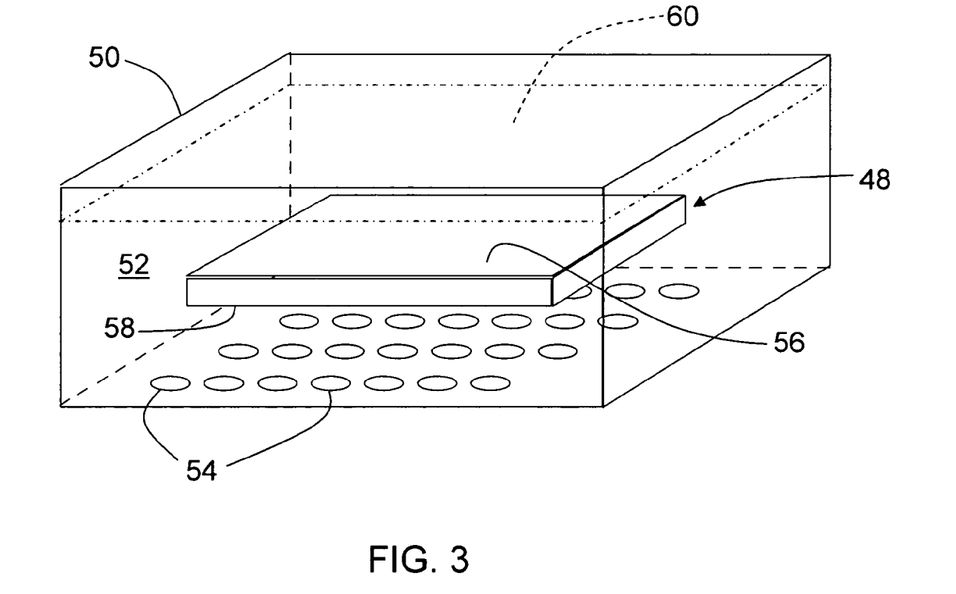
FIG. 3 is a perspective view of an embodiment of a glass sheet measurement apparatus according to an embodiment of the present invention.

In a preferred embodiment, a plurality of measurements may be taken substantially simultaneously by a plurality of sensors 54 arranged in an array, as shown in FIG. 3. In this embodiment a plurality of sensors may be arrayed in a two-dimensional array preferably substantially parallel with the surface of the glass sheet to be measured. Advantageously, a large number of measurements may be taken in an amount of time similar to that in which a single measurement is taken using only a single sensor.

As previously described, glass sheet 48 may be placed on and supported by exposed surface 60 of fluid 52 prior to measurement of the glass sheet, and maintained on surface 60 by surface tension. Alternatively, glass sheet 48 may be placed beneath exposed surface 60 when the density of the fluid is sufficiently near the density of the glass sheet that the glass sheet is substantially neutrally buoyant. Preferably, the surface of the glass sheet to be measured is in a plane substantially parallel to the plane containing the range of motion of sensor 54 if sensor 54 is moved relative to glass sheet 48, or substantially parallel to the plane of the array of sensors if a plurality of sensors is used. Sensor 54 may be moved, for example, by mounting the sensor on a suitable carriage which may be conveyed on rails by a stepper motor (not shown), or other methods as are known in the art. Simply put, it is desirable that glass sheet 48 be maintained in a horizontal position and that movement of sensor 54 is in a plane parallel to the plane of glass sheet 48. Any offset, due to angling of the glass sheet for example, should be known and the measurement adjusted accordingly. Thus, it is possible that multiple sensors, or the range of motion of a single sensor, and the general plane of the glass sheet not be in parallel planes if the offset from parallel is known. However, such offset is not desirable.

Figure 4:
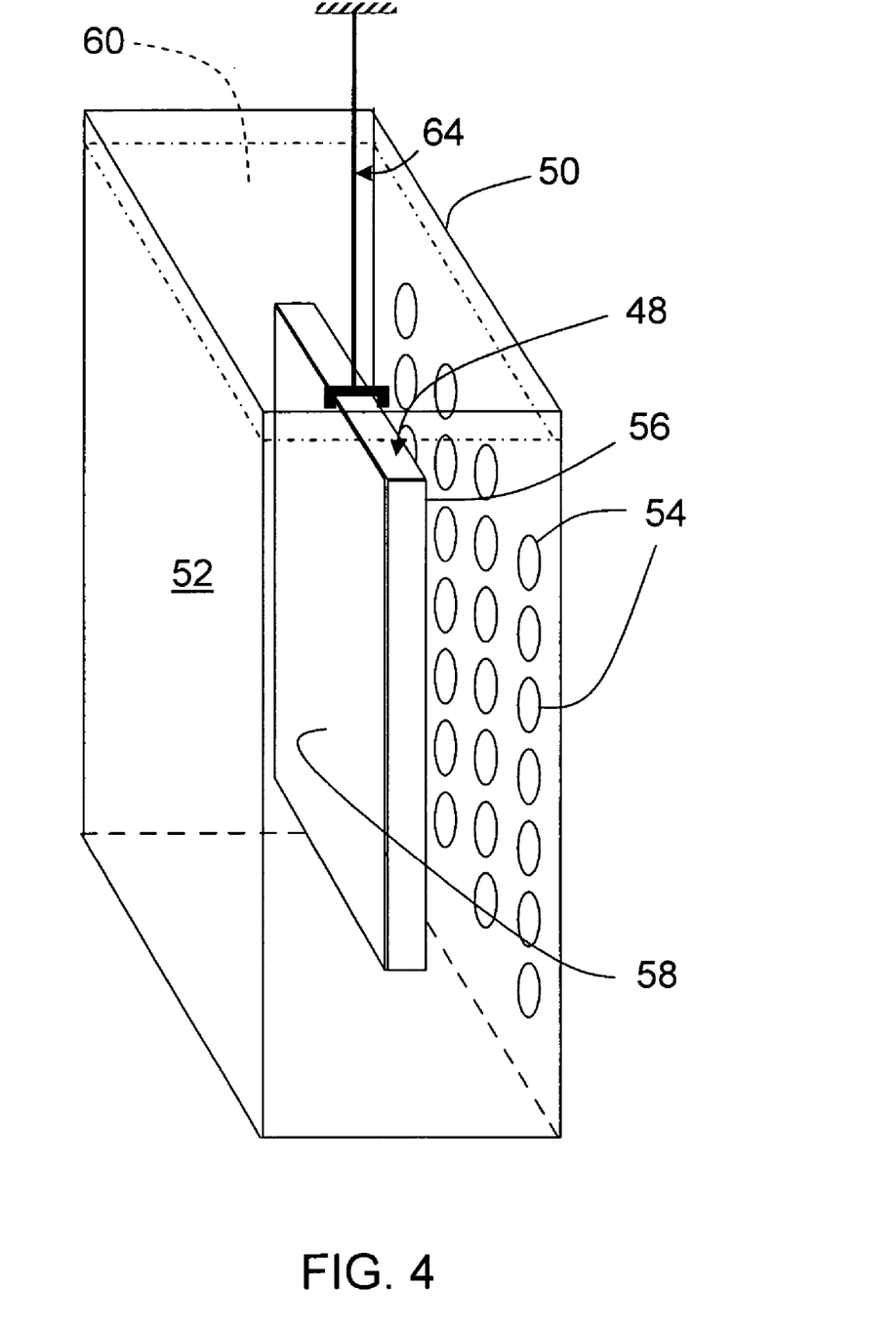
FIG. 4 is a perspective view of still another embodiment of a glass sheet measurement apparatus according to the present invention.

In another embodiment of the present invention, glass sheet 48 may be placed in a vertical position, i.e. orthogonal to the exposed surface 60 of fluid 52, as shown in FIG. 4. Desirably, because the fluid offers only limited support to the edge of the glass sheet, the fluid has a viscosity sufficiently high so as to prevent glass sheet 48 from moving appreciably along a vertical axis during the time required to make the necessary measurements. Alternatively, the glass sheet may be suspended in fluid 52 by support assembly 64, such as a wire and clamp. Preferably, the glass sheet is suspended at only a single location to prevent support assembly 64 from deforming glass sheet 48. In a vertical arrangement, measurement of the glass sheet becomes more difficult because one is typically required to then measure the shape of the glass sheet through the walls of the container. A laser ranging device is then desirable, and at least one wall of the container transparent at the wavelength of the laser. It also becomes necessary to ensure that the interface between the transparent container wall and the fluid within the container, and the interface between the transparent container wall and the environment outside the transparent container wall (e.g. air) are accounted for during the measurement. Advantageously, and similar to the preceding embodiment, an array of sensors at a wall of fluid container 50 and preferably parallel to the glass sheet may be used to shorten the measurement time and mitigate the above described difficulty.

Once a plurality of distance measurements from the sensor or sensors has been obtained, the distance data may be used to determine sheet shape by conventional methods as are known in the art. Preferably, computing device 62 is used to determine a surface contour shape. For example, the data may be used in a computer program, such as Microsoft Excel, and plotted to display a surface contour. More sophisticated analysis may be used to evaluate the data, and may be used to de-convolve separate individual shape elements from the overall shape of the glass sheet. For example, the shape of the glass sheet may comprise at least one of such individual shapes (shape elements) as planar, cylindrical, spherical, elliptical, conic, parabolic and hyperbolic. The surface contour of the sheet may comprise a single shape element or a combination of such shapes.

Figure 5:
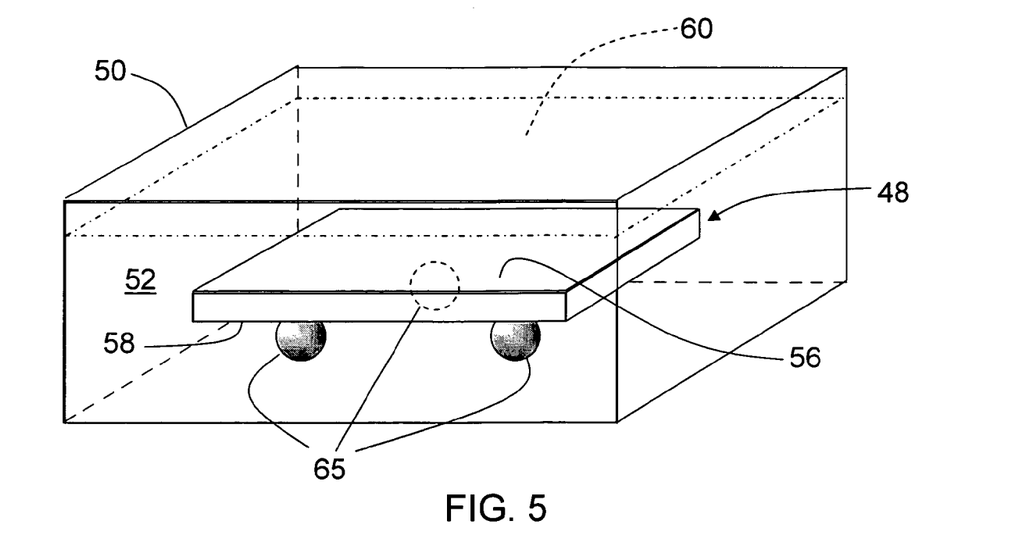
FIG. 5 is a perspective view of an embodiment of a glass sheet measurement apparatus according to the present invention wherein the glass sheet is supported by a plurality of contacting supports.

FIG. 5 illustrates a particularly preferred embodiment according to the present invention. As shown in FIG. 5, glass sheet 48 is supported at discrete points within the fluid by contacting support members 65. That is, the density of the fluid is deliberately less than the density of the glass (but greater than about 85% of the density of the glass) such that the glass sheet settles within the fluid. Thus, the glass sheet is made nearly neutrally buoyant within the fluid, but not exactly so. The glass sheet is supported within the fluid at discrete points by contacting the glass sheet at these points with contacting support members 65. The amount of buoyancy required for the sheet within the fluid is of course dependent upon the degree of accuracy required for the measurement, which ultimately is a function of the end user's needs. However, it has been found that a reasonable buoyancy may be determined based on the maximum anticipated amount of deflection $d_{max}$ of the glass sheet from an ideal plane compared with the degree of precision desired for the measurement, $d_{min}$ according to the relationship $F_b < Fg(d_{min}/d_{max})$, where $F_b$ is the buoyant force on the glass sheet and $F_g$ is the gravitation force on the glass sheet. Support of the glass sheet by support members 65 advantageously prevents movement of the sheet within the fluid which may affect the measurements of the sheet, such as might arise due to thermal gradients within the fluid. Contacting support members 64 may comprise ball bearings placed at the bottom of container 50 within fluid 52, as shown in FIG. 5, or support members 65 may be any other point shapes such as pins, pyramids or the like which are known within the art.

While a variety of support arrangements made be used, it has been found that three point contact with support members 65 provides sufficient tradeoff between adequately restraining the sheet while simultaneously incurring minimum measurement interference. That is, geometric placement of support members 65 may be optimized to minimize the bending moment of any portion of the glass sheet with respect to gravitational forces. An optimum placement of the contact points is in the shape of a triangle, preferably an isosceles triangle.

Figure 6:
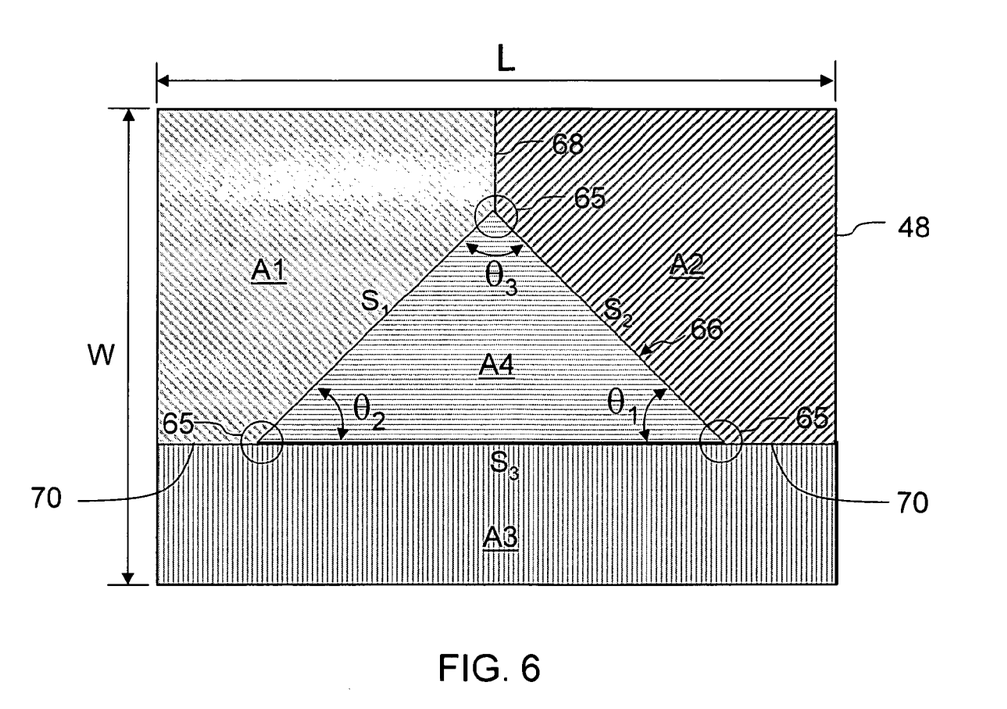
FIG. 6 is a diagrammatic representation of a preferred arrangement of the supports of FIG. 5.

Referring to FIG. 6, triangle 66 is an isosceles triangle comprising angle $\theta_3$, two sides $S_1$ and $S_2$ of equal length and adjacent to their intersection at the apex of the triangle at angle $\theta_3$, and a base side $S_3$ opposite the apex of the triangle at angle $\theta_3$. The length of glass sheet 48 is designated by reference numeral L and the width of the glass sheet is designated by reference numeral W. Area A1 is the area of glass sheet 48 between the edges of glass sheet 48, line 68 between the apex of triangle 66 at $\theta_3$ and horizontal line 70 (passing through base $S_3$) between the apex of triangle 66 at $\theta_2$ and the left edge of the glass sheet as viewed in the figure. Similarly, area A2 is the area of glass sheet 48 between the edges of glass sheet 48, line 68 between the apex of triangle 66 at $\theta_3$ and above horizontal line 70 between the apex of triangle 66 at $\theta_1$ and the right edge of the glass sheet as viewed in the figure. Area A4 is the area of triangle 66. The total area of glass sheet 48 (on one side of the glass sheet) is approximately equal to A1+A2+A3+A4. In accordance with the present preferred embodiment the following method may be used to determine a position for the supports that offers optimal support. In FIG. 6, A3 is equal to ⅓ (A1+A2+A4), i.e. A1 is equal to A2 which is equal to A3 which is equal to A4, where A3 represents the area of sheet 48 below line 70 and A1+A2+A3 is equal to the area of sheet 48 above line 70, and; the ratio of the length of base side $S_1$ to one half the length of base side $S_3$ is equal to the ratio of the length L to the width W of glass sheet 48. Solving for the optimum placement of support members 65 according to the above criteria may be easily accomplished by the skilled artisan using known numerical methods, and yields optimum support placements. It should be noted that although the above geometric analysis is exacting by nature, placement of the supports need not be as exacting, and some degree of deviation from optimum is generally allowable.

Figure 7:
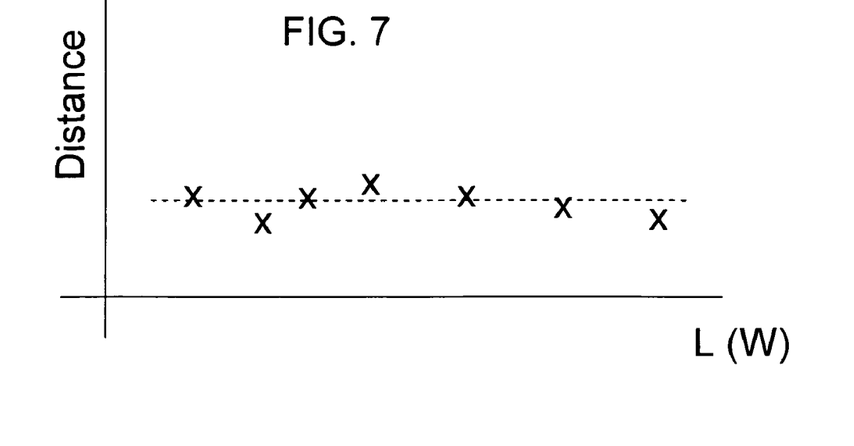
FIG. 7 is an exemplary plot of an ideal plane fitted to hypothetical measurement data for determining the distance (deflection) of the data from the plane.

In practice, levelness of the sensor and its associated apparatus, the container containing the fluid and the support members all combine to make it so that the "zero plane" of the sheet is typically not adequately parallel to the plane of the sensor apparatus. Additionally it has been found that it is not always possible with reasonable effort to place the glass sheet into the fluid without trapping small (~1-3 mm diameter) air bubbles under the sheet. The air bubbles provide a local lift and cant to the sheet (essentially replacing one of the support members with a bubble). Consequently, a correction must be made to the raw deflection data to facilitate direct comparisons between multiple measurements of a single sheet, or sheet-to-sheet comparisons. It has been found that by subtracting a planer fit to the measured points, such as by a least-squares method, a corrected zero or reference plane can be generated and the data compared. A contour map of glass sheet 48 may thus be made by calculating the distance (deflection) from the fitted reference plane for each measurement point. A one-dimensional illustration of such an approach is shown in FIG. 7, where a reference plane (the dotted line) is shown fit to a group of hypothetical measurement data (x's) along the length (or width) of the glass sheet. Deflection from the fitted reference plane may be determined from the vertical axis. Of course, an actual fit would be made along two dimensions rather than the illustrated single dimension.

Figure 8:
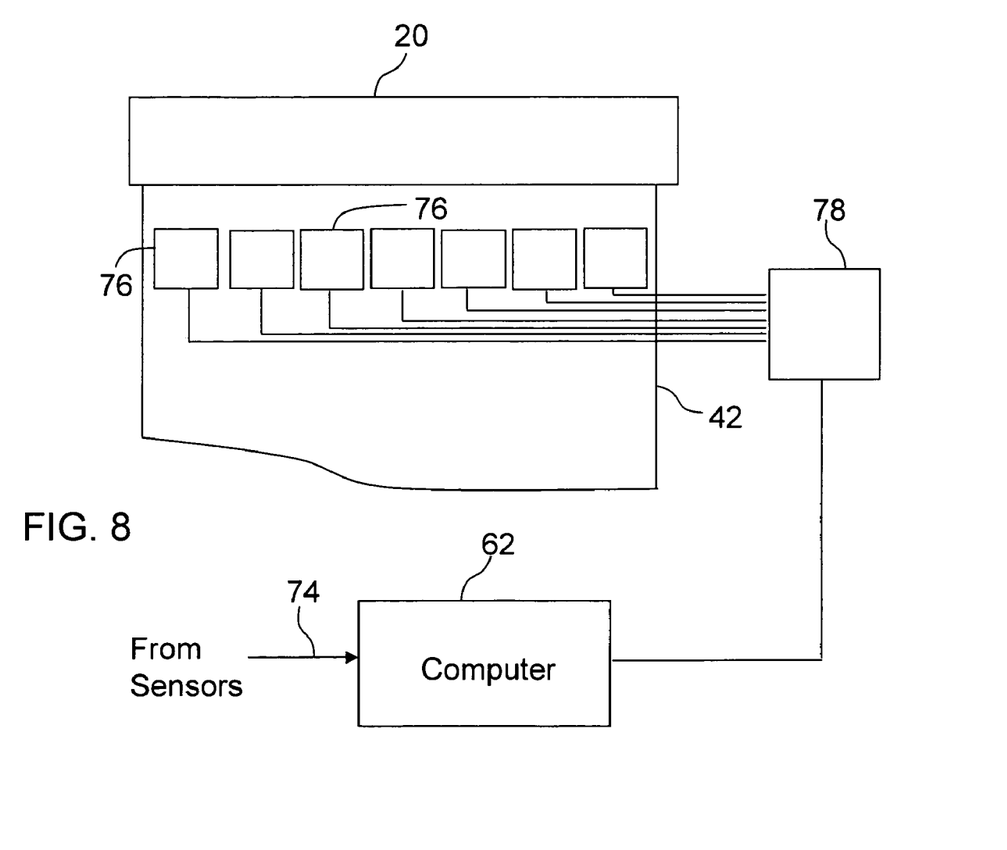
FIG. 8 is a schematic view of a glass manufacturing process using a glass measuring system according to an embodiment of the present invention.
Figure 9A:
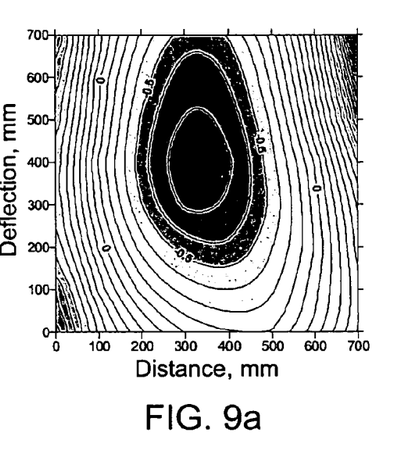
FIGS. 9a-9d are surface contour plots indicating the deflection of a sheet of glass from a reference plane in four different orientations spaced 90 degrees apart, one from another.
Figure 9B:
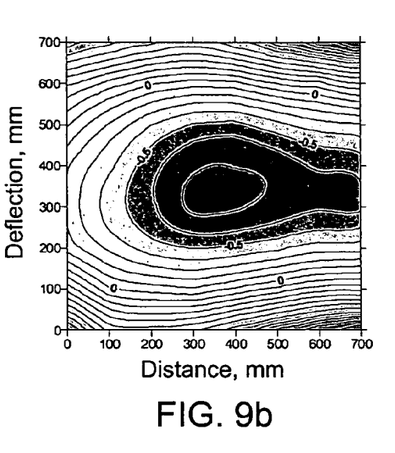
Figure 9C:
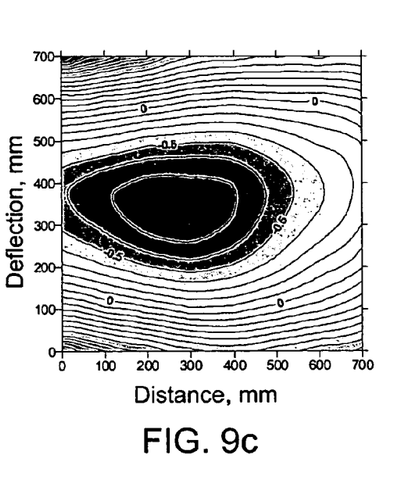
Figure 9D:
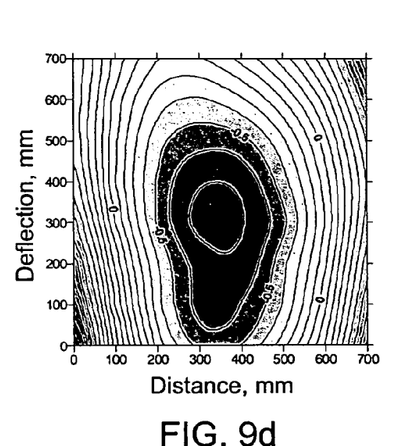

Once the overall two-dimensional surface contour of glass sheet 48 has been determined, this surface contour, or shape, may be de-convolved into individual elementary shape elements using known analysis techniques. Knowledge of the individual shape elements may then be fed back into the glass sheet manufacturing process and used to modify the stress and/or shape of the glass ribbon being drawn. For example, the glass ribbon may be exposed to a spatial and/or time-based temperature profile during the time in which the glass ribbon is at a temperature above the elastic region, which may compensate for the particular shape element. The temperature profile may be derived from the plot of the shape of the previously measured glass sheet, or from a mathematical model thereof, and applied to the glass ribbon subsequently formed. Illustratively, this may be accomplished by varying the temperature of a plurality of heaters 66 arranged across one or both sides of the glass sheet as the sheet is being drawn. Advantageously, glass forming conditions are typically maintained relatively stable, so that off-line measurements of the shape of a downstream portion of the glass ribbon (i.e. a glass sheet separated from the ribbon) may be used to effectively modify upstream portions of the ribbon. As depicted in FIG. 8, a portion of glass ribbon 42 drawn from wedge 20 may be cut to form a glass sheet, wherein the sheet is measured as described hereinabove. The measured data from the at least one sensor 54 is routed via line 74 to computing device 62 which de-convolves the overall shape of the glass sheet into individual shape elements and calculates an appropriate temperature profile to correct for the shape elements. Temperature profile data from computing device 62 may then be used to control heaters 76, such as through heater controller 78, and apply an appropriate temperature profile across the width of glass ribbon 42. Accordingly, the measurement, analysis and application of a prescribed temperature profile forms a feedback system which advantageously corrects for draw-induced shape or and/or stress in subsequently formed glass sheet.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the present invention may be used in other glass manufacturing operations which do not employ the fusion process as described herein. All such modifications and variations are intended to be included herein within the scope of this disclosure and the present invention and protected by the following claims.

EXAMPLE

To demonstrate the repeatability of the glass measurement method disclosed herein, a sheet of glass having length× width dimensions of 730 mm×730 mm, respectively, was placed in an aluminum container of liquid obtained from Cargille Inc. The glass sheet was supported from below by stainless steel ball bearings. The ball bearings were held in place by magnets placed underneath and outside the container. The glass sheet was approximately 0.7 mm in thickness and had a density of about 2.37 g/cm$^3$. The density of the fluid was about 2.36 g/cm$^3$. The ball bearings were arranged in the shape of an equilateral triangle, and the glass sheet was arranged overtop the ball bearings such that the bending moment of the cantilevered portions and the interior portions of the glass sheet were minimized: in the instant case with the center of the sheet aligned with the centroid of the triangle, and a centerline of the sheet aligned with a centerline of the triangle. The glass sheet was measured in a first position by making a plurality of discrete measurements with a single Keyence sensor which was moved relative to the surface of the glass sheet by a rail and stepper motor-driven carriage apparatus which allowed for two-dimensional movement of the sensor parallel with and relative to the surface of the glass sheet. To facilitate measurement of the glass surface, the bottom surface of the glass was painted with white dots. After the first set of measurements were taken, the glass sheet was rotated through an angle of 90 degrees, and a second set of measurements were made. In all, the glass sheet was measured in four positions, each position being rotated 90 degrees from the previous position. A surface contour plot was generated for each successive position. The plots are illustrated sequentially in FIGS. 9a-9d.

FIGS. 9a-9d clearly show deflections from the reference plane having amplitudes of several millimeters against length scales of 100 s of mm with good qualitative repeatability after multiple placements of the sheet, i.e. rotations of the sheet.

What is claimed is:

1. A method of measuring a glass sheet comprising:
    positioning a glass sheet in contact with a fluid having a pre-determined average density and a pre-determined average refractive index, the glass sheet also having a pre-determined average density and a pre-determined average refractive index;

measuring a distance from a sensor to a plurality of points on a surface of the glass sheet to obtain a spatial distribution of distance from the sensor to the surface;

calculating a shape for the glass sheet using the spatial distribution of distance measurements; and wherein the average density of the fluid is at least about 85% of the average density of the glass sheet.

2. The method according to claim 1 wherein the average density of the fluid is at least about 95% of the average density of the glass sheet.

3. The method according to claim 1 wherein the average refractive index of the fluid is different than the average refractive index of the glass sheet.

4. The method according to claim 1 wherein the sensor comprises a laser.

5. The method according to claim 1 wherein the sensor is acoustic.

6. The method according to claim 1 wherein the glass sheet is substantially vertical during the step of measuring.

7. The method according to claim 1 wherein the sensor is in contact with the fluid.

8. The method according to claim 1 wherein the step of measuring comprises a plurality of sensors.

9. The method according to claim 1 further comprising applying a coating to a surface of the glass sheet prior to the step of positioning.

10. The method according to claim 9 wherein the applied coating is discontinuous.

11. The method according to claim 1 wherein the glass sheet is supported in the fluid by a support member during the step of measuring.

12. The method according to claim 11 wherein the glass sheet is supported in the fluid by a plurality of support members.

13. The method according to claim 1 wherein the shape comprises at least one shape element selected from the group consisting of planar, hemispherical, cylindrical, conical, elliptical, parabolic and hyperbolic, or a combination thereof.

14. The method according to claim 13 further comprising using the shape in a glass manufacturing process.

15. The method according to claim 1 wherein the step of measuring comprises causing relative movement between the sensor and the glass sheet.

16. The method according to claim 15 wherein the sensor is moved relative to the glass sheet.

17. An apparatus for measuring glass sheet comprising:

a fluid;

a container for holding the fluid;

at least one sensor for measuring a distance between the at least one sensor to a plurality of points on a surface of a glass sheet in contact with the fluid to obtain a spatial distribution of distance from the sensor to the surface;

a computing device in communication with the sensor for calculating a shape of the glass sheet; and wherein the average density of the fluid is at least about 85% of the average density of the glass sheet.

18. The apparatus according to claim 17 wherein the glass sheet is in contact with a plurality of support members.

19. The apparatus according to claim 17 wherein the support members contact a single side of the glass sheet.

20. A method of measuring a glass sheet comprising:

supporting a glass sheet in a fluid having a pre-determined average density and a pre-determined average refractive index, the glass sheet also having a pre-determined average density and a pre-determined average refractive index, wherein the average density of the fluid is at least about 85% of the average density of the glass sheet;

measuring a distance from a sensor to a surface of the glass sheet.

* * * * *